Figure 1:
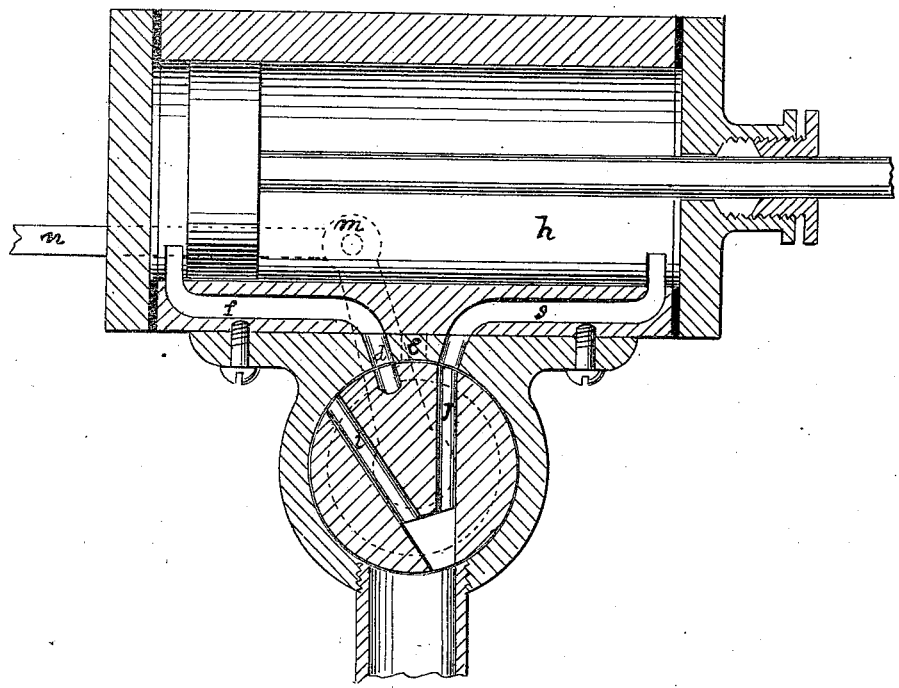
Figure 2:
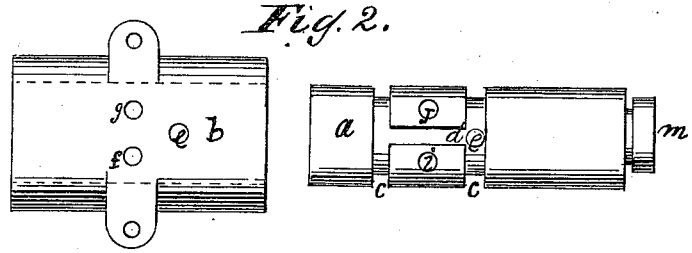
Figure 3:
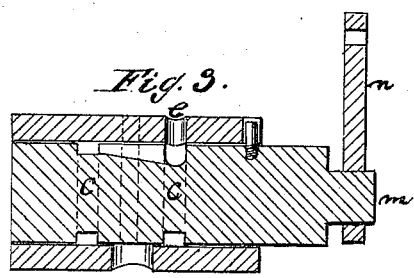

E. H. DEWEY & C. H. PALMER.
Steam-Valve.

No. 161,599.

Patented April 6, 1875.

Witnesses:
Geo. M. Ramsey
Walter H. Montague

Inventors.
E. H. Dewey
C. H. Palmer

UNITED STATES PATENT OFFICE.

EDMUND H. DEWEY AND CHARLES H. PALMER, OF NEW YORK, ASSIGNORS TO CHARLES H. DEWEY, OF BROOKLYN, N. Y.

IMPROVEMENT IN STEAM-VALVES.

Specification forming part of Letters Patent No. 161,599, dated April 6, 1875; application filed December 24, 1874.

*To all whom it may concern:*

Be it known that we, EDMUND H. DEWEY and CHARLES H. PALMER, both of the city, county, and State of New York, have invented an Improved Steam-Valve, the purpose of which is to make such a distribution of the steam as to secure and maintain an equilibrium of pressure, whereby the friction usually arising from steam-pressure upon the valve is almost or wholly obviated, all of which is clearly set forth in the following explanation, including the accompanying drawings and letters of reference marked thereon.

$a$ is a cylinder fitted within the cylinder $b$, thus forming the exterior and interior of the valve. $c\ c$ are grooves extending around the circumference of $a$, while $d$ is a canal uniting said grooves. $e$ is the steam-port, which connects by pipe directly with the steam-boiler, and by which grooves $c\ c$ and canal $d$ are constantly filled with live steam. $f$ and $g$ are conduits through which steam enters, and is discharged from steam-cylinder $h$, while $i$ and $j$ are exhaust-ports. $m$ is the lever, and $n$ is the connecting-rod by which the valve is oscillated.

To obtain the desired extent of oscillation requires no explanation.

From this description it is seen that the valve is a cylindrical oscillating valve.

We claim—

1. Cylinders $a\ b$, in combination with conduits $f\ g$, ports $i$, $j$, and $e$, when arranged to operate by oscillation of the valve, substantially as herein set forth.

2. Grooves $c\ c$ and canal $d$, when said grooves encircle the entire circumference of $a$, as and for the purposes described.

EDMUND H. DEWEY.
CHARLES H. PALMER.

Witnesses:
GEO. M. RAMSAY,
WALTER W. MONTAGUE.